US012795492B2

(12) United States Patent
Chi

(10) Patent No.: US 12,795,492 B2
(45) Date of Patent: Nov. 10, 2026

(54) CROSS-CARRIER SCHEDULING METHOD, APPARATUS, AND STORAGE MEDIUM

(71) Applicant: Beijing Xiaomi Mobile Software Co., Ltd., Beijing (CN)

(72) Inventor: Liangang Chi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 18/682,268

(22) PCT Filed: Aug. 9, 2021

(86) PCT No.: PCT/CN2021/111630
§ 371 (c)(1),
(2) Date: Feb. 8, 2024

(87) PCT Pub. No.: WO2023/015423
PCT Pub. Date: Feb. 16, 2023

(65) Prior Publication Data
US 2024/0349153 A1 Oct. 17, 2024

(51) Int. Cl.
*H04W 36/30* (2009.01)
*H04W 28/02* (2009.01)
*H04W 28/082* (2023.01)

(52) U.S. Cl.
CPC ..... *H04W 36/304* (2023.05); *H04W 28/0236* (2013.01); *H04W 28/082* (2023.05)

(58) Field of Classification Search
None
See application file for complete search history.

(56) References Cited

U.S. PATENT DOCUMENTS 10,542,583 B1 * 1/2020 Pan ........................ H04W 80/08
2017/0019237 A1 1/2017 Yang et al.
(Continued)

FOREIGN PATENT DOCUMENTS

CN 103024919 A 4/2013
CN 103874212 A 6/2014
(Continued)

OTHER PUBLICATIONS

ISA State Intellectual Property Office of the People's Republic of China, International Search Report Issued in Application No. PCT/CN2021/111630, Nov. 29, 2021, WIPO, 4 pages.
(Continued)

*Primary Examiner* — Xavier S Wong
(74) *Attorney, Agent, or Firm* — Volpe Koenig

(57) ABSTRACT

A cross-carrier scheduling method, apparatus, and a storage medium that improves cross-carrier scheduling in a wireless communication network. The cross-carrier scheduling is improved by: configuring an associated secondary cell associated with a target secondary cell, the target secondary cell being a secondary cell configured to schedule a physical shared channel of a primary cell and/or a primary secondary cell; and in response to determining that the physical shared channel of the primary cell and/or the primary secondary cell is unable to be scheduled through the target secondary cell, switching a scheduling carrier carrying a physical downlink control channel (PDCCH) from the target secondary cell to the associated secondary cell, or to the primary cell and/or the primary secondary cell, the PDCCH being configured to schedule the physical shared channels of the primary cell and/or the primary secondary cell.

12 Claims, 8 Drawing Sheets

(56) References Cited

U.S. PATENT DOCUMENTS

| | | | | |
|---|---|---|---|---|
| 2020/0092909 | A1 | 3/2020 | Ekpenyong | |
| 2022/0110181 | A1* | 4/2022 | Miao | H04L 5/0023 |
| 2023/0199752 | A1* | 6/2023 | Shi | H04L 5/0044 |

FOREIGN PATENT DOCUMENTS

| | | | |
|---|---|---|---|
| CN | 111132344 | A | 5/2020 |
| CN | 111132359 | A | 5/2020 |
| WO | 2021087913 | A1 | 5/2021 |
| WO | 2021135251 | A1 | 7/2021 |

OTHER PUBLICATIONS

Vivo.“Discussion on Scell scheduling P(S)cell”,3GPP TSG RAN WG1 #102-e R1-2006409, Aug. 8, 2020,4 pages.

Panasonic.“PDCCH with cross carrier operation”, 3GPP TSG-RAN WG1 Meeting #60 R1-101249, Feb. 16, 2010, 5 pages.

State Intellectual Property Office of the People’s Republic of China, Office Action and Search Report Issued in Application No. 2021800024663, May 30, 2025, 9 pages. (Submitted with Machine Translation).

ASUSTeK, “Discussion on cross-carrier scheduling from SCell to PCell”, R1-2008695, 3GPP TSG RAN WG1 #103, e-Meeting, Oct. 26-Nov. 13, 2020, 5 pages.

ISA State Intellectual Property Office of the People’s Republic of China, Written Opinion of the International Searching Authority Issued in Application No. PCT/CN2021/111630, Nov. 29, 2021, WIPO, 7 pages.

* cited by examiner

CROSS-CARRIER SCHEDULING METHOD, APPARATUS, AND STORAGE MEDIUM

CROSS REFERENCE TO RELATED APPLICATIONS

The present application is a U.S. National Stage of International Application No. PCT/CN2021/111630 filed on Aug. 9, 2021, the content of which is incorporated herein by reference in its entirety.

TECHNICAL FIELD

The present disclosure relates to the field of communications and, in particular, to cross-carrier scheduling methods, apparatuses, and storage media.

BACKGROUND

Initial deployment of new generation mobile communication technologies usually occurs in areas with high traffic density and high demand for new services, followed by a gradual expansion of coverage. During the phased deployment of new access technologies, the mixed coverage of new and old technologies becomes an inevitable demand for operator networks.

Even in areas where new technologies have been deployed, it is often necessary to retain the earlier technologies and have them co-exist with the new technologies for a significant period of time, to ensure continued service for older equipment that does not support the new technologies. 5th Generation Mobile Communication Technology (5G) New Radio (NR) can be deployed in the same frequency spectrum as Long Term Evolution (LTE), thereby dynamically sharing the total frequency spectrum capacity between the two technologies, which results in higher frequency spectrum efficiency. In the case of LTE and NR sharing the primary carrier, there is a tendency for the Primary Cell (PCell) and/or Primary Secondary Cell (PSCell) to experience a shortage of Physical Downlink Control Channel (PDCCH) resources.

SUMMARY

In order to overcome problems in the related art, embodiments of the present disclosure provide cross-carrier scheduling methods and apparatuses, and storage media.

According to a first aspect of embodiments of the present disclosure, there is provided a cross-carrier scheduling method, performed by a network device, including: configuring an associated secondary cell associated with a target secondary cell, the target secondary cell being a secondary cell configured to schedule a physical shared channel of a primary cell and/or a primary secondary cell; and in response to determining that the physical shared channel of the primary cell and/or the primary secondary cell is unable to be scheduled through the target secondary cell, switching a scheduling carrier carrying a physical downlink control channel (PDCCH) from the target secondary cell to the associated secondary cell, the PDCCH being configured to schedule the physical shared channel of the primary cell and/or the primary secondary cell.

According to a second aspect of embodiments of the present disclosure, there is provided a cross-carrier scheduling method, performed by a network device, including: in response to determining that a physical shared channel of a primary cell and/or a primary secondary cell is unable to be scheduled through a target secondary cell, determining that no associated secondary cell associated with the target secondary cell is configured, the target secondary cell being a secondary cell configured to schedule the physical shared channel of the primary cell and/or the primary secondary cell; and switching a scheduling carrier carrying a physical downlink control channel (PDCCH) from the target secondary cell to the primary cell and/or the primary secondary cell, the PDCCH being configured to schedule the physical shared channel of the primary cell and/or the primary secondary cell.

According to a third aspect of embodiments of the present disclosure, there is provided a cross-carrier scheduling method, performed by a terminal, including: receiving configuration information of an associated secondary cell associated with a target secondary cell sent by a network device, the target secondary cell being a secondary cell configured to schedule a physical shared channel of a primary cell and/or a primary secondary cell; determining that the network device is unable to schedule the physical shared channel of the primary cell and/or the primary secondary cell through the target secondary cell; and based on the configuration information of the associated secondary cell, determining that the network device switches a scheduling carrier carrying a physical downlink control channel (PDCCH) from the target secondary cell to the associated secondary cell, the PDCCH being configured to schedule the physical shared channel of the primary cell and/or the primary secondary cell.

It should be understood that the above general description and the detailed description that follows are examples and explanations only and do not limit the present disclosure.

BRIEF DESCRIPTION OF DRAWINGS

The accompanying drawings herein are incorporated into and form a part of this specification, illustrating embodiments in accordance with the disclosure and, together with the description, serve to explain the principles of the disclosure.

DETAILED DESCRIPTION

Embodiments will be described herein in detail, examples of which are represented in the accompanying drawings. When referring to the accompanying drawings, unless otherwise indicated, the same numerals in the different accompanying drawings indicate the same or similar elements. The embodiments described in the following examples do not represent all embodiments consistent with this disclosure. Rather, they are only examples of apparatuses and methods consistent with some aspects of this disclosure as detailed in the appended claims.

The terms used in the present disclosure are used solely for the purpose of describing particular embodiments and are not intended to limit the present disclosure. The singular forms of "a," "the," and "said" used in this disclosure and the appended claims are also intended to encompass the majority form, unless the context clearly indicates otherwise. It should also be understood that the term "and/or" as used herein refers to and encompasses any or all possible combinations of at least one of the listed items in association.

It should be understood that while the terms first, second, third, etc., may be employed in the present disclosure to describe various types of information, such information should not be limited to these terms. These terms are only used to distinguish the same type of information from one another. For example, without departing from the scope of the present disclosure, first information may also be referred to as second information, and similarly, second information may also be referred to as first information. Depending on the context, as used herein, the phrase "if" may be interpreted as "at . . . " or "when . . . " or "in response to determining."

A cross-carrier scheduling method provided by the present disclosure is first described from a base station.

In a first scheme, in a case that a physical shared channel of a primary cell and/or a primary secondary cell is unable to be scheduled through a target secondary cell, a scheduling carrier carrying physical downlink control channel (PDCCH) is switched from the target secondary cell to an associated secondary cell.

Figure 1:
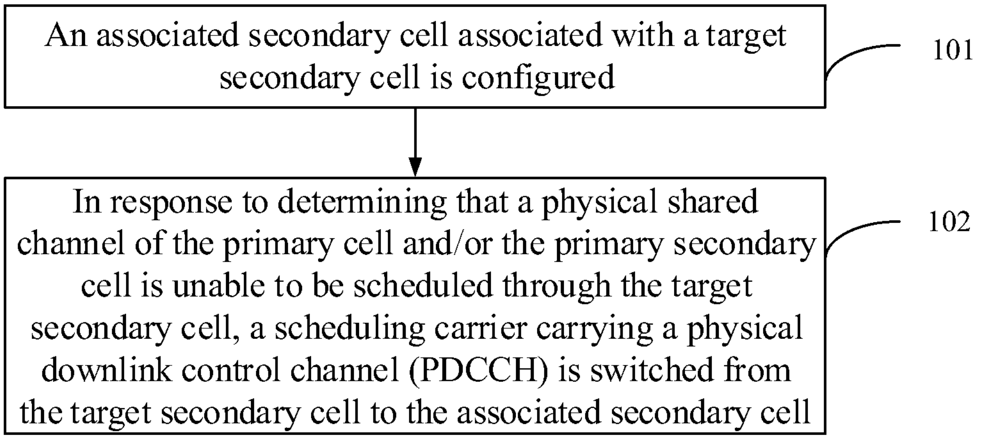
FIG. 1 is a schematic flowchart illustrating a cross-carrier scheduling method according to an example.

Embodiments of the present disclosure provide a cross-carrier scheduling method. Referring to FIG. 1, FIG. 1 is a flowchart illustrating a cross-carrier scheduling method according to an embodiment, the method being applied to a network device, which includes, but is not limited to, a base station. The method can include the following steps.

In step 101, an associated secondary cell associated with a target secondary cell is configured.

In embodiments of the present disclosure, the target secondary cell may be a scheduling secondary cell (sSCell), indicating a secondary cell configured to schedule a physical shared channel of a primary cell and/or a primary secondary cell, where the physical shared channel includes, but is not limited to, a Physical Downlink Shared Channel (PDSCH), and/or, a Physical Uplink Shared Channel (PUSCH).

In step 102, in response to determining that a physical shared channel of the primary cell and/or the primary secondary cell is unable to be scheduled through the target secondary cell, a scheduling carrier carrying a physical downlink control channel (PDCCH) is switched from the target secondary cell to the associated secondary cell.

The PDCCH is configured to schedule a physical shared channel of the primary cell and/or the primary and secondary cell.

In the above embodiment, a network device may configure an associated secondary cell associated with a target secondary cell. In the case that a physical shared channel of the primary cell and/or the primary secondary cell is unable to be scheduled through the target secondary cell, the network device switches a scheduling carrier carrying a physical downlink control channel (PDCCH) to the associated secondary cell, where the PDCCH is configured to schedule the physical shared channel of the primary cell and/or the primary secondary cell. This solution can achieve a rapid switch of the scheduling carrier, resolve the issue of insufficient PDCCH resources in the primary cell and/or the primary secondary cell, and better adapt to changes in load and link quality, thereby enhancing the utilization of system resources.

Figure 2:
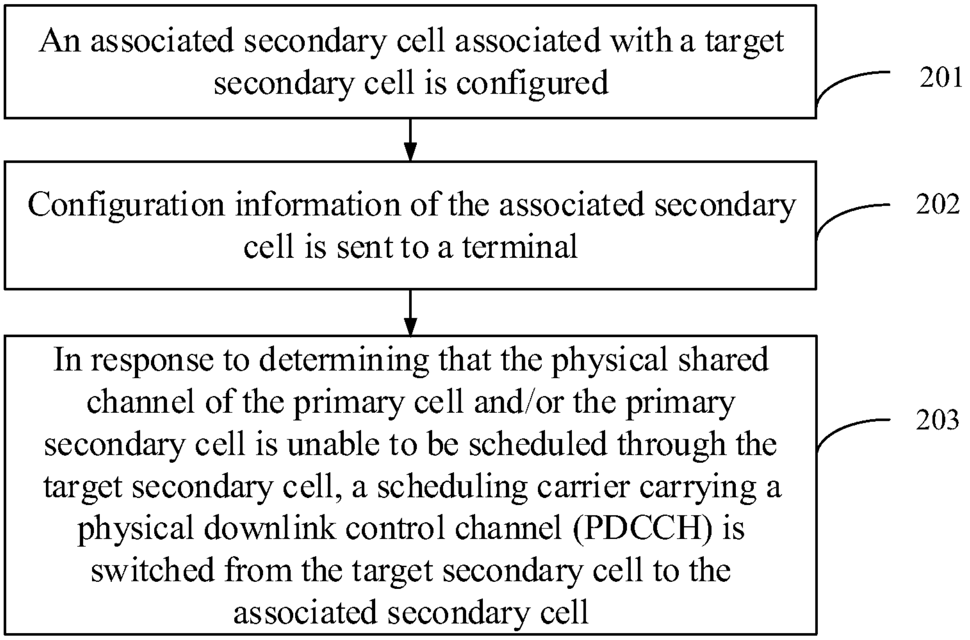
FIG. 2 is a schematic flowchart illustrating another cross-carrier scheduling method according to an example.

In some embodiments, with reference to FIG. 2, FIG. 2 is a flowchart illustrating a cross-carrier scheduling method according to an embodiment, the method being applied to a network device, which includes, but is not limited to, a base station. The method can include the following steps.

In step 201, an associated secondary cell associated with a target secondary cell is configured.

The target secondary cell is a secondary cell configured to schedule a physical shared channel of a primary cell and/or a primary secondary cell.

In step 202, configuration information of the associated secondary cell is sent to a terminal.

After configuring the associated secondary cell associated with the target secondary cell, the network device may send configuration information of the associated secondary cell to the terminal.

In embodiments of the present disclosure, the configuration information of the associated secondary cell may include, but is not limited to, at least one of the following: a control resource set of the associated secondary cell; and/or, a search space of the associated secondary cell; and/or, an index value of the primary cell and/or the primary secondary cell in scheduling information of the associated secondary cell.

In embodiments of the present disclosure, based on the index value of the primary cell and/or the primary secondary cell in the scheduling information of the associated secondary cell, the terminal may determine that the scheduling carrier of the associated secondary cell schedules a physical shared channel of the primary cell and/or the primary secondary cell. In an example, the terminal may determine a resource location of the PDCCH on the scheduling carrier, based on at least one of a Control Resource Set (CORESET) of the associated secondary cell, and a search space of the associated secondary cell, after the network device switches the scheduling carrier to the associated secondary cell. In this way, after the PDCCH is demodulated, the objective of scheduling the physical shared channel of the primary and/or primary-secondary cell is achieved.

In step 203, in response to determining that the physical shared channel of the primary cell and/or the primary secondary cell is unable to be scheduled through the target secondary cell, a scheduling carrier carrying a physical downlink control channel (PDCCH) is switched from the target secondary cell to the associated secondary cell.

The PDCCH is configured to schedule the physical shared channel of the primary cell and/or the primary secondary cell.

In the above embodiment, after configuring an associated secondary cell associated with the target secondary cell, the network device may send the configuration information of the associated secondary cell to the terminal, so as to carry out a switching of the scheduling carrier to switch the scheduling carrier from the target secondary cell to the associated secondary cell when it is subsequently determined that a physical shared channel of the primary cell and/or the primary secondary cell is unable to be scheduled through the target secondary cell. This solution can resolve the issue of insufficient PDCCH resources in the primary cell and/or primary secondary cell, and better adapt to changes in load and link quality, thereby enhancing the utilization of system resources.

In a possible implementation, in response to determining that the target secondary cell is deactivated, the network device may determine that the physical shared channel of the primary cell and/or the primary secondary cell cannot be scheduled through the target secondary cell.

In another possible implementation, in response to receiving indication information of Radio Link Failure (RLF) for the target secondary cell from the terminal, the network device may determine that the physical shared channel of the primary cell and/or the primary secondary cell is unable to be scheduled through the target secondary cell.

In another possible implementation, in response to determining that the target secondary cell is deactivated and receiving the RLF indication information for the target secondary cell from the terminal, the network device may determine that the physical shared channel of the primary cell and/or the primary secondary cell is unable to be scheduled through the target secondary cell.

In the above embodiments, the network device may, depending on the different cases, determine that the physical shared channel of the primary cell and/or the primary secondary cell is unable to be scheduled through the target secondary cell, and accordingly, carry out the switching of the scheduling carrier, which is easy to implement and has high availability.

In a second scheme, in a case where the physical shared channel of the primary cell and/or the primary secondary cell is unable to be scheduled through the target secondary cell, the scheduling carrier carrying the physical downlink control channel (PDCCH) is switched from the target secondary cell to the primary cell and/or the primary secondary cell.

Figure 3:
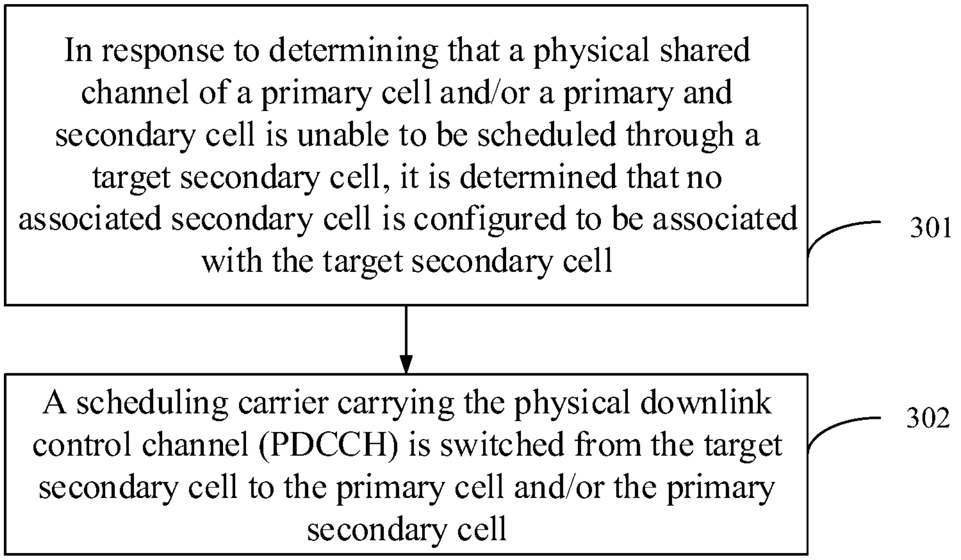
FIG. 3 is a schematic flowchart illustrating another cross-carrier scheduling method according to an example.

Embodiments of the present disclosure provide a cross-carrier scheduling method. Referring to FIG. 3, FIG. 3 is a flowchart illustrating a cross-carrier scheduling method according to an embodiment, the method being applied to a network device, which includes, but is not limited to, a base station. The method can include the following steps.

In step 301, in response to determining that a physical shared channel of a primary cell and/or a primary secondary cell is unable to be scheduled through a target secondary cell, it is determined that no associated secondary cell is configured to be associated with the target secondary cell.

The target secondary cell is a secondary cell configured to schedule the physical shared channel of the primary cell and/or the primary secondary cell.

In a possible implementation, in response to determining that the target secondary cell is deactivated, the network device may determine that the physical shared channel of the primary cell and/or the primary secondary cell cannot be scheduled through the target secondary cell.

In another possible implementation, in response to receiving RLF indication information for the target secondary cell from the terminal, the network device may determine that the physical shared channel of the primary cell and/or the primary secondary cell is unable to be scheduled through the target secondary cell.

In another possible implementation, in response to determining that the target secondary cell is deactivated and receiving the RLF indication information for the target secondary cell from the terminal, the network device may determine that the physical shared channel of the primary cell and/or the primary secondary cell is unable to be scheduled through the target secondary cell.

In step 302, a scheduling carrier carrying the physical downlink control channel (PDCCH) is switched from the target secondary cell to the primary cell and/or the primary secondary cell.

The PDCCH is configured to schedule the physical shared channel of the primary cell and/or primary secondary cell.

In the above embodiment, in a case where the physical shared channel of the primary cell and/or the primary secondary cell cannot be scheduled through the target secondary cell and no associated secondary cell is configured to be associated with the target secondary cell, a network device may switch a scheduling carrier carrying a physical downlink control channel (PDCCH) from the target secondary cell to the primary cell and/or the primary secondary cell, the PDCCH being configured to schedule the primary cell and/or the primary secondary cell. This solution can achieve a rapid switch of the scheduling carrier, autonomous scheduling by the primary cell and/or the primary secondary cell, and a better adaptation to changes in load and link quality, thereby enhancing the utilization of system resources.

In summary, in a case of determining that the physical shared channel of the primary cell and/or the primary secondary cell is unable to be scheduled through the target secondary cell, different methods are adopted to switch the scheduling carrier depending on whether or not the associated secondary cell is configured. When an associated secondary cell associated with the target secondary cell is configured, the scheduling carrier is switched from the target secondary cell to the associated secondary cell; and when no associated secondary cell associated with the target secondary cell is configured, the scheduling carrier is switched from the target secondary cell to the primary cell and/or the primary secondary cell. This solution can resolve the issue of insufficient PDCCH resources in the primary cell and/or the primary secondary cell, and better adapt to changes in load and link quality, thereby enhancing the utilization of system resources. Next, the cross-carrier scheduling methods, in accordance with aspects of the present disclosure, are described below from the terminal.

In a first scheme, based on received configuration information of the associated secondary cell, it is determined that the network device switches the scheduling carrier carrying the physical downlink control channel (PDCCH) from the target secondary cell to the associated secondary cell.

Figure 4:
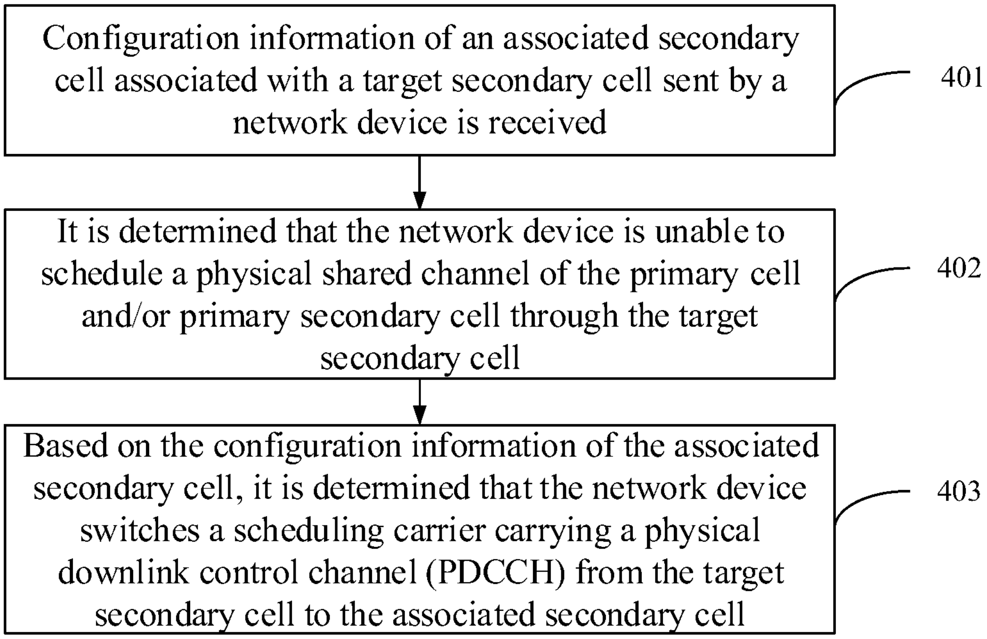
FIG. 4 is a schematic flowchart illustrating another cross-carrier scheduling method according to an example.

Embodiments of the present disclosure provide a cross-carrier scheduling method. Referring to FIG. 4, FIG. 4 is a flowchart illustrating a cross-carrier scheduling method according to an embodiment, the method being applied to a terminal. The method may include the following steps.

In step 401, configuration information of an associated secondary cell associated with a target secondary cell sent by a network device is received.

The target secondary cell is a secondary cell configured to schedule a physical shared channel of a primary cell and/or a primary secondary cell.

In step 402, it is determined that the network device is unable to schedule a physical shared channel of the primary cell and/or primary secondary cell through the target secondary cell.

In a possible implementation, when determining that the target secondary cell is deactivated, the terminal determines that the network device is unable to schedule the physical shared channel of the primary cell and/or the primary secondary cell through the target secondary cell.

In another possible implementation, in a case where the terminal has sent RLF indication information for the target secondary cell to the network device, the terminal determines that the network device is unable to schedule a physical shared channel of the primary cell and/or the primary secondary cell through the target secondary cell.

In step 403, based on the configuration information of the associated secondary cell, it is determined that the network device switches a scheduling carrier carrying a physical downlink control channel (PDCCH) from the target secondary cell to the associated secondary cell.

The PDCCH is configured to schedule a physical shared channel of the primary cell and/or the primary secondary cell.

In the above embodiment, when determining that the network device is unable to schedule the physical shared channel of the primary cell and/or the primary secondary cell through the target secondary cell, the terminal may determine that the network device will switch the scheduling carrier from the target cell to the associated secondary cell based on the configuration information of the associated secondary cell sent by the network device. This solution achieves a rapid switch of the scheduling carrier, resolves the issue of insufficient PDCCH resources in the primary cell and/or the primary secondary cell, and better adapts to changes in load and link quality, thereby enhancing the utilization of system resources.

In some embodiments, the configuration information of the associated secondary cell includes at least one of: a control resource set of the associated secondary cell; a search space of the associated secondary cell; and/or an index value of the primary cell and/or the primary secondary cell in scheduling information of the associated secondary cell.

In embodiments of the present disclosure, after the scheduling carrier is switched to the associated secondary cell, based on the index value of the primary cell and/or the primary secondary cell in the scheduling information of the associated secondary cell, the terminal may determine that the scheduling carrier schedules a physical shared channel of the primary cell and/or the primary-secondary cell. The terminal may also determine a location of PDCCH on the scheduling carrier based on at least one of a control resource set of the associated secondary cell and a search space of the associated secondary cell, thereby demodulating the PDCCH, and achieving the objective of scheduling a physical shared channel of the primary cell and/or the primary secondary cell based on the demodulated PDCCH.

In a second scheme, it is determined that no configuration information of the associated secondary cell is received, and the network device switches the scheduling carrier carrying the physical downlink control channel (PDCCH) from the target secondary cell to the primary cell and/or the primary secondary cell.

Figure 5:
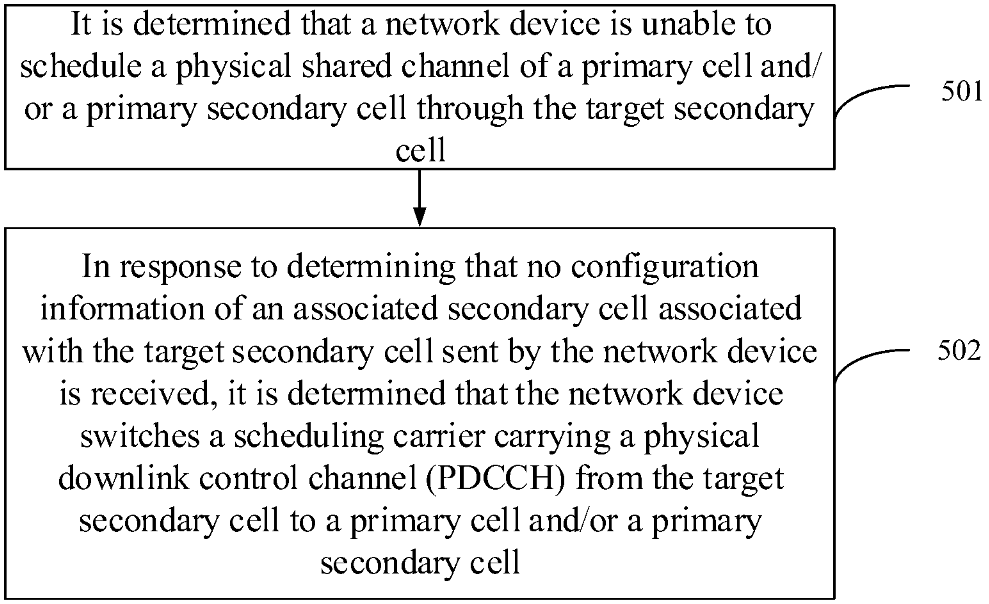
FIG. 5 is a schematic flowchart illustrating another cross-carrier scheduling method according to an example.

Embodiments of the present disclosure provide a cross-carrier scheduling method. Referring to FIG. 5, FIG. 5 is a flowchart illustrating a cross-carrier scheduling method according to an embodiment, the method being applied to a terminal. The method may include the following steps.

In step 501, it is determined that a network device is unable to schedule a physical shared channel of a primary cell and/or a primary secondary cell through a target secondary cell.

In a possible implementation, in response to determining that the target secondary cell is deactivated, the terminal determines that the network device is unable to schedule the physical shared channel of the primary cell and/or the primary secondary cell through the target secondary cell.

In another possible implementation, in a case that the terminal has sent RLF indication information for the target secondary cell to the network device, the terminal determines that the network device is unable to schedule a physical shared channel of the primary cell and/or primary secondary cell through the target secondary cell.

In another possible implementation, in response to determining that the target secondary cell is deactivated and receiving the RLF indication information for the target secondary cell from the terminal, the network device may determine that the physical shared channel of the primary cell and/or the primary secondary cell is unable to be scheduled through the target secondary cell.

In step 502, in response to determining that no configuration information of an associated secondary cell associated with the target secondary cell sent by the network device is received, it is determined that the network device switches a scheduling carrier carrying a physical downlink control channel (PDCCH) from the target secondary cell to a primary cell and/or a primary secondary cell.

In embodiments of the present disclosure, if the terminal does not receive configuration information of an associated secondary cell associated with the target secondary cell sent by the network device, the terminal may determine that the network device does not configure the associated secondary cell, and may determine that the network device switches the scheduling carrier from the target secondary cell to the primary cell and/or the primary secondary cell. For example, an autonomous scheduling will be subsequently performed by the primary cell and/or primary-secondary cell.

In the above embodiments, a rapid switch of the scheduling carrier is realized. In the case where the network device is unable to schedule the physical shared channel of the primary cell and/or the primary secondary cell through the target secondary cell and has not configured an associated secondary cell associated with the target secondary cell, an autonomous-scheduling can be performed by the primary cell and/or the primary-secondary cell, and a better adaption to the changes in the load and the link quality can be achieved, thereby enhancing the utilization of the system resources.

Figure 6:
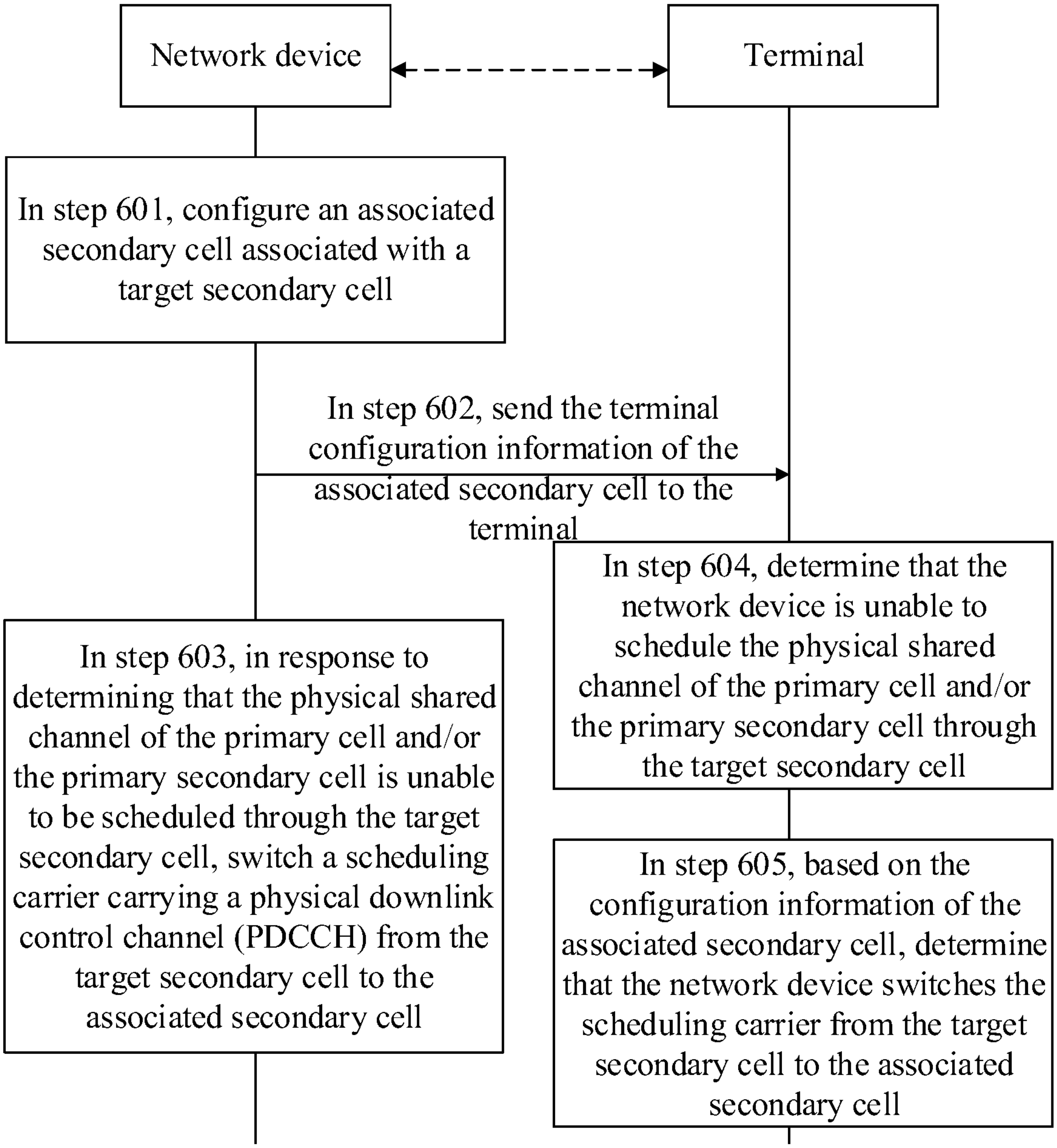
FIG. 6 is a schematic flowchart illustrating another cross-carrier scheduling method according to an example.

In some embodiments, referring to FIG. 6, FIG. 6 is a flowchart illustrating a cross-carrier scheduling method according to an embodiment. The method may include the following steps.

In step 601, the network device configures an associated secondary cell associated with a target secondary cell.

The target secondary cell is a secondary cell configured to schedule a physical shared channel of a primary cell and/or a primary secondary cell.

In step 602, the network device sends configuration information of the associated secondary cell to the terminal.

The configuration information of the associated secondary cell includes at least one of: a control resource set of the associated secondary cell; a search space of the associated secondary cell; and/or, an index value of the primary cell and/or the primary secondary cell in the scheduling information of the associated secondary cell.

In step 603, in response to determining that the physical shared channel of the primary cell and/or the primary secondary cell is unable to be scheduled through the target secondary cell, the network device switches a scheduling carrier carrying a physical downlink control channel (PDCCH) from the target secondary cell to the associated secondary cell.

The PDCCH is configured to schedule the physical shared channel of the primary cell and/or the primary secondary cell.

In response to determining that the target secondary cell is deactivated, the network device determines that a physical shared channel of the primary cell and/or the primary secondary cell is unable to be scheduled through the target secondary cell. Or, in response to receiving RLF indication information for the target secondary cell from the terminal, the network device determines that the physical shared channel of the primary cell and/or the primary secondary cell cannot be scheduled through the target secondary cell. Or, in response to determining that the target secondary cell is deactivated and receiving RLF indication information for the target secondary cell sent by the terminal, the network device determines that the physical shared channel of the primary cell and/or the primary secondary cell is unable to be scheduled through the target secondary cell.

In step 604, the terminal determines that the network device is unable to schedule the physical shared channel of the primary cell and/or the primary secondary cell through the target secondary cell.

In step 605, the terminal determines, based on the configuration information of the associated secondary cell, that the network device switches the scheduling carrier from the target secondary cell to the associated secondary cell.

In the above embodiment, the network device can configure an associated secondary cell associated with the target secondary cell, and when it is unable to schedule the physical shared channel of the primary cell and/or the primary secondary cell through the target secondary cell, the network device switches the scheduling carrier carrying the physical downlink control channel (PDCCH) to the associated secondary cell, the PDCCH being configured to schedule the physical shared channel of the primary cell and/or the primary secondary cell. This solution can achieve a rapid switch of the scheduling carrier, resolve the issue of insufficient PDCCH resources in the primary cell and/or the primary secondary cell, and better adapt to changes in load and link quality, thereby enhancing the utilization of system resources.

Figure 7:
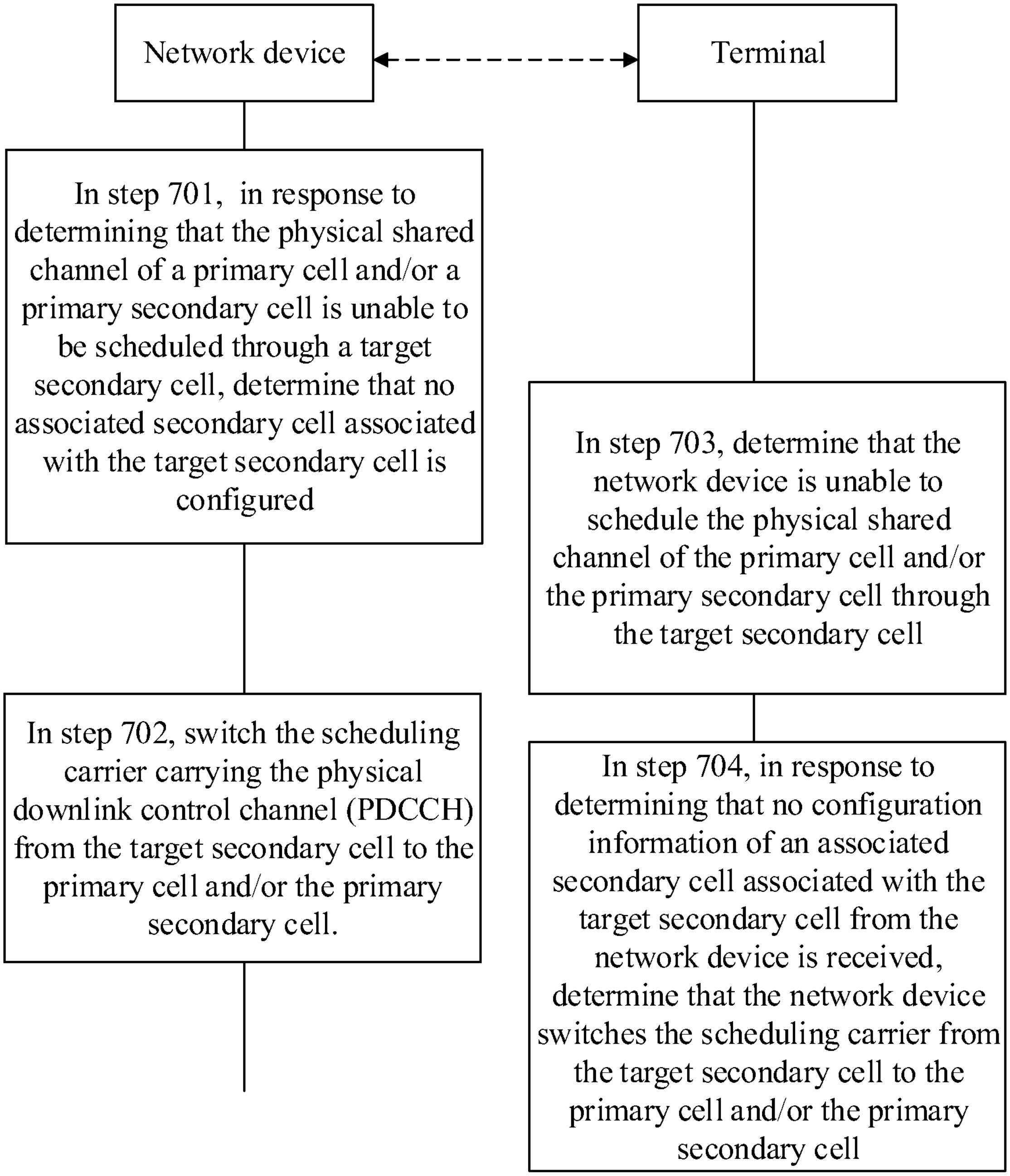
FIG. 7 is a schematic flowchart illustrating another cross-carrier scheduling method according to an example.

In some embodiments, referring to FIG. 7, FIG. 7 is a flowchart illustrating a cross-carrier scheduling method according to an embodiment. The method may include the following steps.

In step 701, in response to determining that a physical shared channel of a primary cell and/or a primary secondary cell is unable to be scheduled through a target secondary cell, the network device determines that no associated secondary cell associated with the target secondary cell is configured.

In response to determining that the target secondary cell is deactivated, the network device determines that a physical shared channel of the primary cell and/or the primary secondary cell is unable to be scheduled through the target secondary cell. Or, in response to receiving RLF indication information for the target secondary cell from the terminal, the network device determines that the physical shared channel of the primary cell and/or the primary secondary cell cannot be scheduled through the target secondary cell. Or, in response to determining that the target secondary cell is deactivated and receiving RLF indication information for the target secondary cell sent by the terminal, the network device determines that a physical shared channel of the primary and/or primary-secondary cell is unable to be scheduled through the target secondary cell.

In step 702, the network device switches the scheduling carrier carrying the physical downlink control channel (PDCCH) from the target secondary cell to the primary cell and/or the primary secondary cell.

The PDCCH is configured to schedule the physical shared channel of the primary cell and/or the primary secondary cell.

In step 703, the terminal determines that the network device is unable to schedule the physical shared channel of the primary cell and/or the primary secondary cell through the target secondary cell.

In step 704, in response to determining that no configuration information of an associated secondary cell associated with the target secondary cell from the network device is received, the terminal determines that the network device switches the scheduling carrier from the target secondary cell to the primary cell and/or the primary secondary cell.

In the above embodiment, in a case where the physical shared channel of the primary cell and/or the primary secondary cell cannot be scheduled through the target secondary cell and no associated secondary cell is configured to be associated with the target secondary cell, the network device may switch a scheduling carrier carrying a physical downlink control channel (PDCCH) from the target secondary cell to the primary cell and/or the primary secondary cell, the PDCCH being configured to schedule the primary cell and/or the primary secondary cell. This solution achieves a rapid switch of the scheduling carrier, autonomous scheduling by the primary cell and/or the primary secondary cell, and better adaptations to changes in load and link quality, thereby enhancing the utilization of system resources.

In summary, in a case of determining that the physical shared channel of the primary cell and/or the primary secondary cell is unable to be scheduled through the target secondary cell, different methods are adopted to switch the scheduling carrier depending on whether or not an associated secondary cell associated with the target secondary cell is configured. When the associated secondary cell associated with the target secondary cell is configured, the scheduling carrier is switched from the target secondary cell to the associated secondary cell; and when no associated secondary cell associated with the target secondary cell is configured, the scheduling carrier is switched from the target secondary cell to the primary cell and/or the primary secondary cell. This solution resolves the issue of insufficient PDCCH resources in the primary cell and/or the primary secondary cell, adapts to changes in load, and improves the link quality, thereby enhancing the utilization of system resources.

Corresponding to the foregoing embodiments of methods for realizing application functions, the present disclosure also provides embodiments of apparatuses for realizing application functions.

Figure 8:
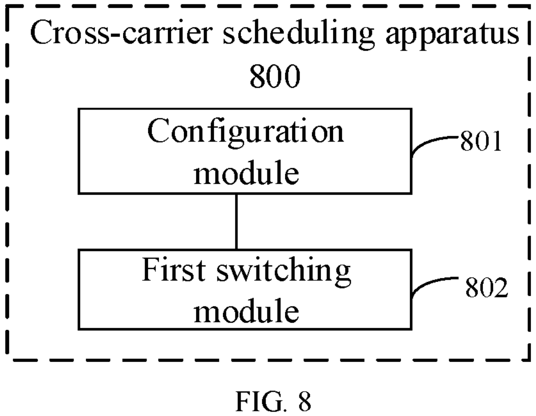
FIG. 8 is a block diagram illustrating a cross-carrier scheduling apparatus according to an example.

Referring to FIG. 8, FIG. 8 is a block diagram illustrating a cross-carrier scheduling apparatus 800 according to an example, performed by a network device, including:

a configuration module 801, for configuring an associated secondary cell associated with a target secondary cell, the target secondary cell being a secondary cell configured to schedule a physical shared channel of a primary cell and/or a primary secondary cell; and a first switching module 802, for in response to determining that the physical shared channel of the primary cell and/or the primary secondary cell is unable to be scheduled through the target secondary cell, switching a scheduling carrier carrying a physical downlink control channel (PDCCH) from the target secondary cell to the associated secondary cell, the PDCCH being configured to schedule the physical shared channel of the primary cell and/or the primary secondary cell.

Figure 9:
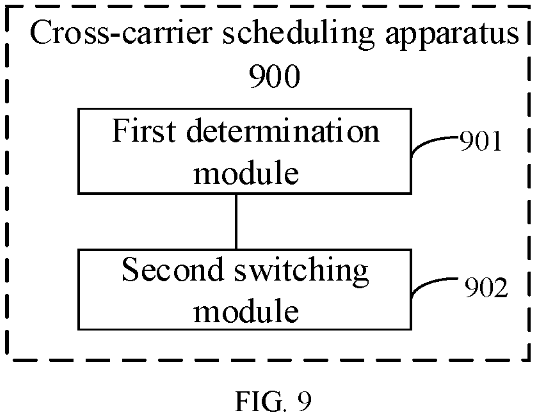
FIG. 9 is a block diagram illustrating another cross-carrier scheduling apparatus according to an example.

Referring to FIG. 9, FIG. 9 is a block diagram illustrating a cross-carrier scheduling apparatus 900 according to an example, performed by a network device, including a first determination module 901 and second switching module 902.

The first determination module 901, in response to determining that a physical shared channel of a primary cell and/or a primary secondary cell is unable to be scheduled through a target secondary cell, determines that no associated secondary cell associated with the target secondary cell is configured. The target secondary cell being a secondary cell configured to schedule the physical shared channel of the primary cell and/or the primary secondary cell.

The second switching module 902 switches a scheduling carrier carrying a physical downlink control channel (PDCCH) from the target secondary cell to the primary cell and/or the primary secondary cell, the PDCCH being configured to schedule the physical shared channel of the primary cell and/or the primary secondary cell.

Figure 10:
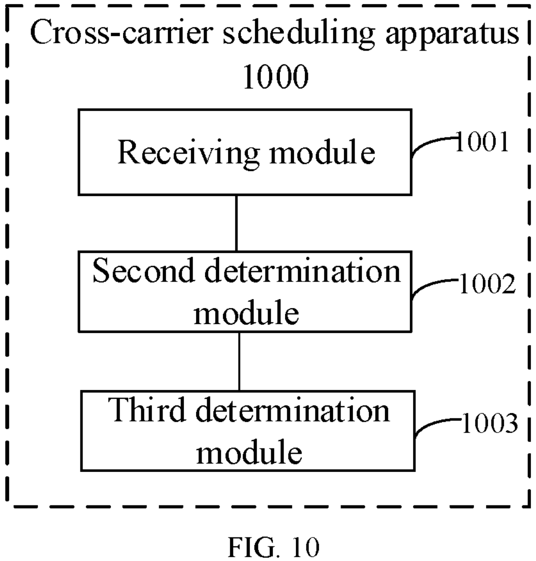
FIG. 10 is a block diagram illustrating another cross-carrier scheduling apparatus according to an example.

Referring to FIG. 10, FIG. 10 is a block diagram illustrating a cross-carrier scheduling apparatus 1000 according to an example, performed by a terminal, including a receiving module 1001, a second determination module 1002, and a third determination module 1003.

The receiving module 1001 is for receiving configuration information of an associated secondary cell associated with a target secondary cell sent by a network device, the target secondary cell being a secondary cell configured to schedule a physical shared channel of a primary cell and/or a primary secondary cell.

The second determination module 1002 is for determining that the network device is unable to schedule the physical shared channel of the primary cell and/or the primary secondary cell through the target secondary cell.

The third determination module 1003, based on the configuration information of the associated secondary cell, determines that the network device switches a scheduling carrier carrying a physical downlink control channel (PDCCH) from the target secondary cell to the associated secondary cell. The PDCCH being configured to schedule the physical shared channel of the primary cell and/or the primary secondary cell.

Figure 11:
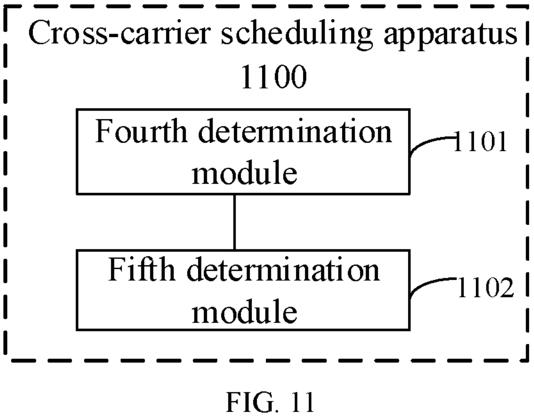
FIG. 11 is a block diagram illustrating another cross-carrier scheduling apparatus according to an example.

Referring to FIG. 11, FIG. 11 is a block diagram illustrating a cross-carrier scheduling apparatus 1100 according to an example, performed by a terminal, including a fourth determination module 1101 and a fifth determination module 1102.

The fourth determination module 1101 is for determining that a network device is unable to schedule a physical shared channel of a primary cell and/or a primary secondary cell through a target secondary cell, the target secondary cell being a secondary cell configured to schedule the physical shared channel of the primary cell and/or the primary secondary cell.

The fifth determination module 1102, in response to determining that no configuration information of an associated secondary cell associated with the target secondary cell sent by the network device is received, determines that the network device switches a scheduling carrier carrying a physical downlink control channel (PDCCH) from the target secondary cell to the primary cell and/or the primary secondary cell. The PDCCH is configured to schedule the physical shared channel of the primary cell and/or the primary secondary cell.

For the embodiments of the apparatuses that implement the embodiments of the methods, it is sufficient to refer to a part of the description for the embodiments of the methods where relevant. The above-described device embodiments are merely schematic, where the above-described units illustrated as separated components may or may not be physically separated, and the components displayed as units may or may not be physical units, i.e., they may be located in one place or may be distributed to a plurality of network units. Some or all of these modules can be selected to fulfill the purpose of the presently disclosed scheme, depending on actual needs. It can be understood and implemented by a person of ordinary skill in the art without creative efforts.

Accordingly, the present disclosure also provides a computer-readable storage medium. The storage medium stores a computer program. The computer program is configured to perform any one of the above-described cross-carrier scheduling methods for the network device.

Accordingly, the present disclosure also provides a computer-readable storage medium. The storage medium stores a computer program. The computer program is configured to perform any one of the described cross-carrier scheduling methods for the terminal.

Accordingly, the present disclosure also provides a cross-carrier scheduling apparatus including a processor and a memory for storing processor-executable instructions. The processor is configured to perform any one of the described cross-carrier scheduling methods for the network device.

Figure 12:
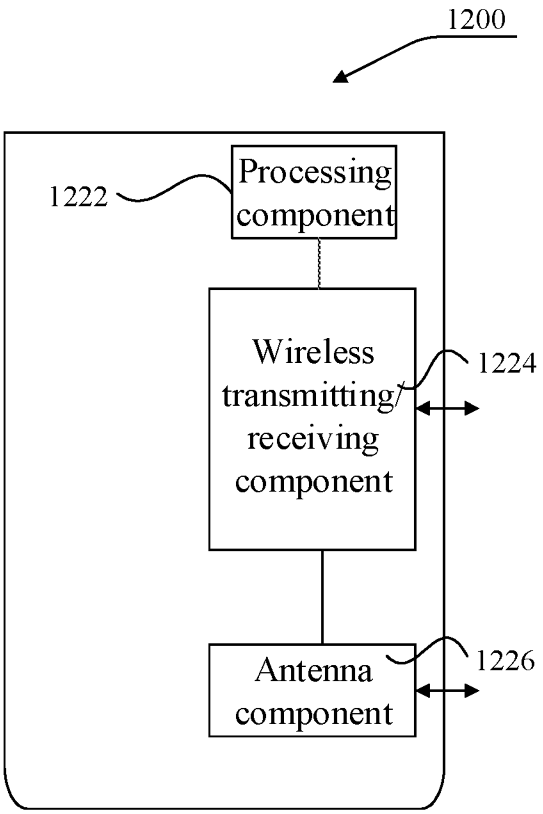
FIG. 12 is a schematic structural diagram illustrating a cross-carrier scheduling apparatus according to an example of this disclosure.

As shown in FIG. 12, FIG. 12 is a schematic diagram illustrating a structure of a cross-carrier scheduling apparatus 1200 according to an example. The cross-carrier scheduling apparatus 1200 may be provided as a network device, such as a base station. Referring to FIG. 12, the cross-carrier scheduling apparatus 1200 includes a processing component 1222, a wireless transmitting/receiving component 1224, an antenna component 1226, and a signal processing portion specific to the wireless interface. The processing component 1222 may further include at least one processor.

One of the processors in the processing component 1222 may be configured to perform any one of the above-described cross-carrier scheduling methods for the network device.

Accordingly, the present disclosure also provides a cross-carrier scheduling apparatus including a processor and a memory for storing processor-executable instructions. The processor is configured to perform any one of the described cross-carrier scheduling methods for the terminal.

Figure 13:
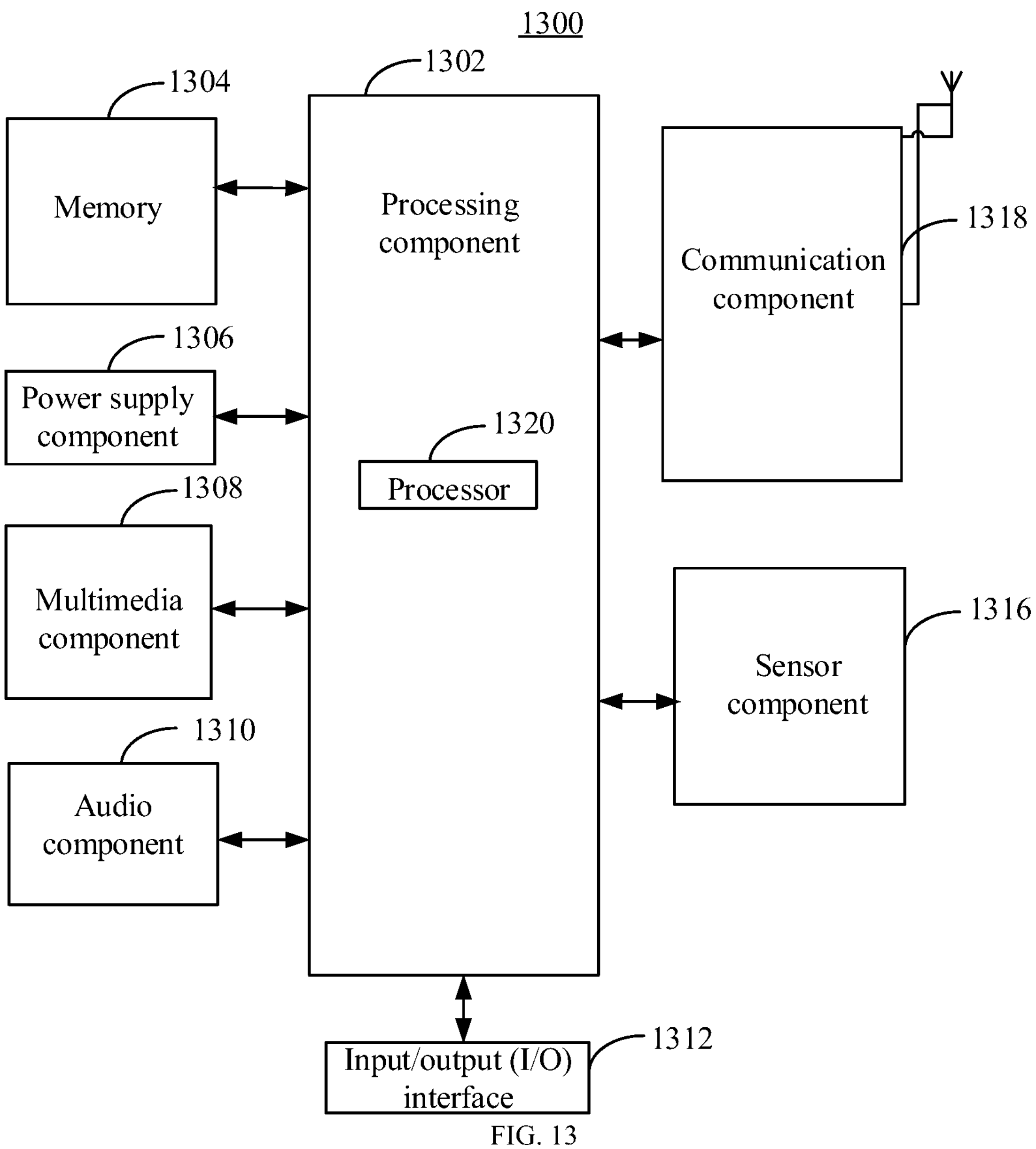
FIG. 13 is a schematic structural diagram illustrating another cross-carrier scheduling apparatus according to an example of this disclosure.

FIG. 13 is a block diagram illustrating a cross-carrier scheduling apparatus 1300 according to an example. The cross-carrier scheduling apparatus 1300 may be, for example, a terminal such as a cell phone, a tablet, an e-book reader, a multimedia playback device, a wearable device, an in-vehicle user device, an iPad, a smart TV, and the like.

Referring to FIG. 13, the cross-carrier scheduling apparatus 1300 may include one or more of the following components: a processing component 1302, a memory 1304, a power supply component 1306, a multimedia component

1308, an audio component 1310, an input/output (I/O) interface 1312, a sensor component 1316, and a communication component 1318.

The processing component 1302 generally controls the overall operation of the cross-carrier scheduling apparatus 1300, such as operations associated with displays, telephone calls, data random access, camera operations, and recording operations. The processing component 1302 may include one or more processors 1320 to execute instructions to accomplish all or some of the steps of the cross-carrier scheduling method described above. In addition, the processing component 1302 may include one or more modules to facilitate interaction with other components. For example, the processing component 1302 may include a multimedia module to facilitate interaction between the multimedia component 1308 and the processing component 1302. As another example, the processing component 1302 may read executable instructions from a memory to implement the steps of a cross-carrier scheduling method provided by the above embodiments.

The memory 1304 is configured to store various types of data to support operation at the cross-carrier scheduling apparatus 1300. Examples of such data include instructions for any applications or methods operating on the cross-carrier scheduling apparatus 1300, contact data, phone book data, messages, pictures, videos, etc. The memory 1304 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk, or CD-ROM.

The power supply component 1306 provides power to various components of the cross-carrier scheduling apparatus 1300. The power supply component 1306 may include a power management system, one or more power sources, and other components associated with generating, managing, and distributing power for the cross-carrier scheduling apparatus 1300.

The multimedia component 1308 includes a display providing an output interface between the cross-carrier scheduling apparatus 1300 and the user. In some embodiments, the multimedia component 1308 includes a front camera and/or a rear camera. The front camera and/or the rear camera may receive external multimedia data when the cross-carrier scheduling apparatus 1300 is in an operational mode, such as a shooting mode or a video mode. Each front camera and rear camera may be a fixed optical lens system or have a focal length and optical zoom capability.

The audio component 1310 is configured to output and/or input audio signals. For example, the audio component 1310 includes a microphone (MIC) configured to receive external audio signals when the cross-carrier scheduling apparatus 1300 is in an operational mode, such as a call mode, a recording mode, and a voice recognition mode. The received audio signals may be further stored in memory 1304 or sent through communication component 1318. In some embodiments, the audio component 1310 further includes a speaker for outputting audio signals.

The I/O interface 1312 provides an interface between the processing component 1302 and a peripheral interface module. The peripheral interface module may be a keypad, a click wheel, a button, or the like. These buttons may include, but are not limited to: a home button, a volume button, a start button, and a lock button.

The sensor component 1316 includes one or more sensors for providing an assessment of various aspects of the status of the cross-carrier scheduling apparatus 1300. For example, the sensor component 1316 may detect an open/closed state of the cross-carrier scheduling apparatus 1300, the relative positioning of components, such as the components being the display and keypad of the cross-carrier scheduling apparatus 1300, the sensor component 1316 may also detect a change in the position of the cross-carrier scheduling apparatus 1300 or of a component of the cross-carrier scheduling apparatus 1300, the presence or absence of user contact with the cross-carrier scheduling apparatus 1300, a change in the orientation of the cross-carrier scheduling apparatus 1300 or acceleration/deceleration and a change in temperature of the cross-carrier scheduling apparatus 1300. The sensor component 1316 may include a proximity sensor configured to detect the presence of a nearby object in the absence of any physical contact. The sensor component 1316 may also include an optical sensor, such as a CMOS or CCD image sensor, for use in imaging applications. In some embodiments, the sensor component 1316 may also include an acceleration sensor, a gyroscope sensor, a magnetic sensor, a pressure sensor, or a temperature sensor.

The communication component 1318 is configured to facilitate communication between the cross-carrier scheduling apparatus 1300 and other apparatuses by wired or wireless means. The cross-carrier scheduling apparatus 1300 may access a wireless network based on a communication standard, such as Wi-Fi, 2G, 3G, 4G, 5G, or 6G, or a combination thereof. In an example, the communication component 1318 receives broadcast signals or broadcast-related information from an external broadcast management system through a broadcast channel. In an example, the communication component 1318 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In examples, the cross-carrier scheduling apparatus 1300 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing any of the described multi-card terminal-side one of the described cross-carrier scheduling methods.

In some examples, there is also a non-transitory machine-readable storage medium including instructions, such as a memory 1304 including instructions, the instructions being executable by a processor 1320 of the cross-carrier scheduling apparatus 1300 to accomplish the cross-carrier scheduling method. For example, the non-transitory machine-readable storage medium may be ROM, random access memory (RAM), CD-ROM, magnetic tape, floppy disks, and optical data storage devices, among others.

Other embodiments of the present disclosure will readily come to mind to those skilled in the art upon consideration of the specification and practice of the invention disclosed herein. The present disclosure is intended to cover any variations, uses, or adaptations of the present disclosure that follow the general principles of the present disclosure and includes common knowledge or conventional technical means in the art not disclosed herein. The specification and embodiments are to be regarded as exemplary only, and the true scope and spirit of the present disclosure is indicated by the following claims.

It is to be understood that the present disclosure is not limited to the precise structure that has been described above and illustrated in the accompanying drawings, and that various modifications and changes may be made without departing from its scope. The scope of the present disclosure is limited only by the appended claims.

The invention claimed is:

1. A cross-carrier scheduling method, performed by a network device, comprising:

configuring an associated secondary cell associated with a target secondary cell, the target secondary cell being a secondary cell configured to schedule a physical shared channel of a primary cell and/or a primary secondary cell; and in response to determining that the physical shared channel of the primary cell and/or the primary secondary cell is unable to be scheduled through the target secondary cell, switching a scheduling carrier carrying a physical downlink control channel (PDCCH) from the target secondary cell to the associated secondary cell, the PDCCH being configured to schedule the physical shared channel of the primary cell and/or the primary secondary cell, and wherein determining that the physical shared channel of the primary cell and/or the primary secondary cell is unable to be scheduled through the target secondary cell comprises:

in response to receiving indication information of radio link failure (RLF) for the target secondary cell sent by a terminal, determining that the physical shared channel of the primary cell and/or the primary secondary cell is unable to be scheduled through the target secondary cell.

2. The cross-carrier scheduling method according to claim 1, further comprising:

sending configuration information of the associated secondary cell to the terminal.

3. The cross-carrier scheduling method according to claim 2, wherein the configuration information of the associated secondary cell comprises at least one of:

a control resource set of the associated secondary cell;

a search space of the associated secondary cell; and/or an index value of the primary cell and/or the primary secondary cell in scheduling information of the associated secondary cell.

4. A cross-carrier scheduling method, performed by a network device, comprising:

in response to determining that a physical shared channel of a primary cell and/or a primary secondary cell is unable to be scheduled through a target secondary cell, determining that no associated secondary cell associated with the target secondary cell is configured, the target secondary cell being a secondary cell configured to schedule the physical shared channel of the primary cell and/or the primary secondary cell; and switching a scheduling carrier carrying a physical downlink control channel (PDCCH) from the target secondary cell to the primary cell and/or the primary secondary cell, the PDCCH being configured to schedule the physical shared channel of the primary cell and/or the primary secondary cell, and wherein determining that the physical shared channel of the primary cell and/or the primary secondary cell is unable to be scheduled through the target secondary cell comprises:

in response to receiving indication information of radio link failure (RLF) for the target secondary cell sent by a terminal, determining that the physical shared channel of the primary cell and/or the primary secondary cell is unable to be scheduled through the target secondary cell.

5. A cross-carrier scheduling method, performed by a terminal, comprising:

receiving configuration information of an associated secondary cell associated with a target secondary cell sent by a network device, the target secondary cell being a secondary cell configured to schedule a physical shared channel of a primary cell and/or a primary secondary cell;

determining that the network device is unable to schedule the physical shared channel of the primary cell and/or the primary secondary cell through the target secondary cell; and based on the configuration information of the associated secondary cell, determining that the network device switches a scheduling carrier carrying a physical downlink control channel (PDCCH) from the target secondary cell to the associated secondary cell, the PDCCH being configured to schedule the physical shared channel of the primary cell and/or the primary secondary cell, and wherein determining that the network device is unable to schedule the physical shared channel of the primary cell and/or the primary secondary cell through the target secondary cell comprises:

in response to sending indication information of radio link failure (RLF) for the target secondary cell to the network device, determining that the network device is unable to schedule the physical shared channel of the primary cell and/or the primary secondary cell through the target secondary cell.

6. The cross-carrier scheduling method according to claim 5, wherein the configuration information of the associated secondary cell comprises at least one of:

a control resource set of the associated secondary cell;

a search space of the associated secondary cell; and/or an index value of the primary cell and/or the primary secondary cell in scheduling information of the associated secondary cell.

7. The cross-carrier scheduling method according to claim 5, further comprising:

in response to determining that no configuration information of an associated secondary cell associated with the target secondary cell sent by the network device is received, determining that the network device switches the scheduling carrier carrying the PDCCH from the target secondary cell to the primary cell and/or the primary secondary cell, the PDCCH being configured to schedule the physical shared channel of the primary cell and/or the primary secondary cell.

8. The cross-carrier scheduling method according to claim 7, wherein the configuration information of the associated secondary cell comprises at least one of:

a control resource set of the associated secondary cell;

a search space of the associated secondary cell; and/or an index value of the primary cell and/or the primary secondary cell in scheduling information of the associated secondary cell.

9. A non-transitory computer-readable storage medium storing a computer program, the computer program when executed by one or more processors cause the one or more processors collectively to perform the cross-carrier scheduling method according to claim 1.

10. A non-transitory computer-readable storage medium storing a computer program, the computer program when executed by one or more processors cause the one or more processors collectively to perform the cross-carrier scheduling method according to claim 5.

11. A cross-carrier scheduling apparatus, comprising:

a non-transitory memory for storing processor-executable instructions; and one or more processors that are communicatively coupled to the non-transitory memory, wherein the one or more processors are collectively configured to perform the cross-carrier scheduling method according to claim 1.

12. A cross-carrier scheduling apparatus, comprising:

a non-transitory memory for storing processor-executable instructions;

one or more processors that are communicatively coupled to the non-transitory memory, wherein the one or more processors are collectively configured to perform the cross-carrier scheduling method according to claim 5.

* * * * *